US009524700B2

(12) United States Patent
Singh et al.

(10) Patent No.: US 9,524,700 B2
(45) Date of Patent: Dec. 20, 2016

(54) METHOD AND SYSTEM FOR DISPLAYING IMAGES OF VARIOUS FORMATS ON A SINGLE DISPLAY

(75) Inventors: Darryl Singh, Auckland (NZ); Hayden J. Rosser, Auckland (NZ); Kwan Wong, Auckland (NZ)

(73) Assignee: PURE DEPTH LIMITED, Auckland (NZ)

( * ) Notice: Subject to any disclaimer, the term of this patent is extended or adjusted under 35 U.S.C. 154(b) by 14 days.

(21) Appl. No.: 12/778,039

(22) Filed: May 11, 2010

(65) Prior Publication Data

US 2010/0289819 A1 Nov. 18, 2010

(30) Foreign Application Priority Data

May 14, 2009 (NZ) ........................ 576977
May 27, 2009 (JP) ................. 2009-127521

(51) Int. Cl.
*G09G 5/00* (2006.01)
*G09G 5/14* (2006.01)
*G02F 1/13* (2006.01)
*H04N 13/04* (2006.01)
*G02F 1/1335* (2006.01)
*G09G 3/00* (2006.01)
(Continued)

(52) U.S. Cl.
CPC .............. *G09G 5/14* (2013.01); *G02F 1/1323* (2013.01); *G02F 1/133504* (2013.01); *G09G 3/003* (2013.01); *H04N 13/0029* (2013.01); *H04N 13/0431* (2013.01); *G02F 1/1347* (2013.01); *G09G 2300/023* (2013.01); *G09G 2320/02* (2013.01); *G09G 2320/0666* (2013.01)

(58) Field of Classification Search
CPC G02F 1/1323; G02F 1/133504; G02F 1/1347; H04N 13/0431; H04N 13/029; G09G 2320/0666; G09G 2300/023; G09G 2320/02; G09G 3/003
USPC .......... 348/43, 47, 51, 54, 60; 345/629, 419; 359/464–465; 382/154, 232, 276
See application file for complete search history.

(56) References Cited

U.S. PATENT DOCUMENTS 3,863,246 A 1/1975 Trcka et al.
3,967,881 A 7/1976 Moriyama et al.
4,294,516 A 10/1981 Brooks
(Continued)

FOREIGN PATENT DOCUMENTS

AU 2480600 7/2000
AU 2453800 8/2000
(Continued)

OTHER PUBLICATIONS

"Display", http://web.archive.org/web/20010717132509/http://whatis.techtarget.com/definition/0,,sid9_gci211965,00.html, Jul. 27, 2000.
(Continued)

*Primary Examiner* — Jin-Cheng Wang

(57) ABSTRACT

A method, computer-readable medium and system for manipulating image data are disclosed. A method of manipulating image data includes accessing first image data configured for display using a first display device. Information associated with a manipulation of the first image data is accessed. Second image data is generated from the first image data using the information, wherein the second image data is configured for display using a second display device.

42 Claims, 6 Drawing Sheets

(51) Int. Cl.
*H04N 13/00* (2006.01)
*G02F 1/1347* (2006.01)

(56) References Cited

U.S. PATENT DOCUMENTS

| | | |
|---|---|---|
| 4,333,715 A | 6/1982 | Brooks |
| 4,364,039 A | 12/1982 | Penz |
| 4,371,870 A | 2/1983 | Biferno |
| 4,472,737 A | 9/1984 | Iwasaki |
| 4,485,376 A | 11/1984 | Noble |
| 4,523,848 A | 6/1985 | Gorman et al. |
| 4,568,928 A | 2/1986 | Biferno |
| 4,649,425 A | 3/1987 | Pund |
| 4,757,626 A | 7/1988 | Weinreich |
| 4,768,300 A | 9/1988 | Rutili |
| 4,815,742 A | 3/1989 | Augustine |
| 5,050,965 A | 9/1991 | Conner et al. |
| 5,075,993 A | 12/1991 | Weinreich |
| 5,112,121 A | 5/1992 | Chang et al. |
| 5,113,272 A | 5/1992 | Reamey |
| 5,124,803 A | 6/1992 | Troxel |
| 5,198,936 A | 3/1993 | Stringfellow |
| 5,298,892 A | 3/1994 | Shapiro et al. |
| 5,300,942 A | 4/1994 | Dolgoff |
| 5,302,946 A | 4/1994 | Shapiro et al. |
| 5,361,165 A | 11/1994 | Stringfellow et al. |
| 5,367,801 A | 11/1994 | Ahn |
| 5,369,450 A | 11/1994 | Haseltine et al. |
| 5,473,344 A | 12/1995 | Bacon et al. |
| 5,515,484 A | 5/1996 | Sfarti et al. |
| 5,585,821 A | 12/1996 | Ishikura et al. |
| 5,675,755 A | 10/1997 | Trueblood |
| 5,694,532 A | 12/1997 | Carey et al. |
| 5,695,346 A | 12/1997 | Sekiguchi et al. |
| 5,745,197 A | 4/1998 | Leung et al. |
| 5,764,317 A | 6/1998 | Sadovnik et al. |
| 5,805,163 A | 9/1998 | Bagnas |
| 5,825,436 A | 10/1998 | Knight |
| 5,924,870 A | 7/1999 | Brosh et al. |
| 5,982,417 A | 11/1999 | Blonde |
| 5,990,990 A | 11/1999 | Crabtree |
| 5,999,191 A | 12/1999 | Frank et al. |
| 6,005,654 A | 12/1999 | Kipfer et al. |
| 6,054,969 A | 4/2000 | Haisma |
| 6,215,490 B1 | 4/2001 | Kaply |
| 6,215,538 B1 | 4/2001 | Narutaki et al. |
| 6,341,439 B1 | 1/2002 | Lennerstad |
| 6,356,281 B1 | 3/2002 | Isenman |
| 6,369,830 B1 | 4/2002 | Brunner et al. |
| 6,388,648 B1 | 5/2002 | Clifton et al. |
| 6,438,515 B1 | 8/2002 | Crawford et al. |
| 6,443,579 B1 | 9/2002 | Myers |
| 6,466,185 B2 | 10/2002 | Sullivan et al. |
| 6,525,699 B1 | 2/2003 | Suyama et al. |
| 6,538,660 B1 | 3/2003 | Celi, Jr. et al. |
| 6,587,118 B1 | 7/2003 | Yoneda |
| 6,593,904 B1 | 7/2003 | Marz et al. |
| 6,609,799 B1 | 8/2003 | Myers |
| 6,661,425 B1 | 12/2003 | Hiroaki |
| 6,697,135 B1 | 2/2004 | Baek et al. |
| 6,717,728 B2 | 4/2004 | Putilin |
| 6,720,961 B2 | 4/2004 | Tracy |
| 6,721,023 B1 | 4/2004 | Weiss et al. |
| 6,806,849 B2 | 10/2004 | Sullivan |
| 6,845,578 B1 | 1/2005 | Lucas |
| 6,906,762 B1 | 6/2005 | Witehira et al. |
| 6,940,507 B2 | 9/2005 | Repin et al. |
| 6,958,748 B1 | 10/2005 | Fukui et al. |
| 7,113,188 B2 | 9/2006 | Kuroda et al. |
| 7,616,885 B2 * | 11/2009 | Chen et al. .............. 396/324 |
| 7,619,585 B2 | 11/2009 | Bell et al. |
| 7,703,924 B2 | 4/2010 | Nayar |
| 7,714,821 B2 | 5/2010 | Seen |
| 7,787,688 B1 | 8/2010 | Kass |
| 7,889,250 B2 | 2/2011 | Aragaki |
| 7,891,815 B2 | 2/2011 | Nayar et al. |
| 8,022,962 B2 | 9/2011 | Kurabayashi |
| 8,146,277 B2 | 4/2012 | Engel |
| 8,154,473 B2 | 4/2012 | Engel et al. |
| 8,416,149 B2 | 4/2013 | Evanicky |
| 8,432,411 B2 | 4/2013 | Bell et al. |
| 8,436,873 B2 | 5/2013 | Gao |
| 2002/0001055 A1 | 1/2002 | Kimura et al. |
| 2002/0093516 A1 | 7/2002 | Brunner et al. |
| 2002/0105516 A1 | 8/2002 | Tracy |
| 2002/0118275 A1 * | 8/2002 | Harman .................. 348/51 |
| 2002/0126115 A1 | 9/2002 | Ijntema |
| 2002/0126396 A1 | 9/2002 | Dolgoff |
| 2002/0163728 A1 | 11/2002 | Myers |
| 2002/0163729 A1 | 11/2002 | Myers |
| 2003/0090455 A1 | 5/2003 | Daly |
| 2003/0132895 A1 | 7/2003 | Berstis |
| 2003/0184665 A1 | 10/2003 | Berstis |
| 2004/0008156 A1 | 1/2004 | Kuroda et al. |
| 2004/0008866 A1 | 1/2004 | Rhoads et al. |
| 2004/0239582 A1 | 12/2004 | Seymour |
| 2005/0047657 A1 | 3/2005 | Lee |
| 2005/0062897 A1 | 3/2005 | Lei |
| 2005/0146787 A1 | 7/2005 | Lukyanitsa |
| 2006/0191177 A1 * | 8/2006 | Engel ...................... 40/453 |
| 2006/0193030 A1 | 8/2006 | Babas |
| 2006/0227249 A1 | 10/2006 | Chen et al. |
| 2006/0227419 A1 * | 10/2006 | Cha et al. ............... 359/465 |
| 2007/0024614 A1 | 2/2007 | Tam et al. |
| 2007/0024642 A1 | 2/2007 | Kooi et al. |
| 2007/0035618 A1 * | 2/2007 | Yoshida .................. 348/43 |
| 2007/0036444 A1 * | 2/2007 | Yoshida .................. 382/232 |
| 2007/0036456 A1 | 2/2007 | Hooper |
| 2007/0081716 A1 * | 4/2007 | Ha et al. ................. 382/154 |
| 2007/0097019 A1 * | 5/2007 | Wynne-Powell et al. ..... 345/1.3 |
| 2007/0147698 A1 | 6/2007 | Reid |
| 2007/0165027 A1 | 7/2007 | Nakadaira et al. |
| 2007/0165305 A1 * | 7/2007 | Mehrle .................... 359/464 |
| 2007/0182730 A1 * | 8/2007 | Mashitani et al. ........... 345/419 |
| 2007/0230788 A1 | 10/2007 | Lei |
| 2007/0242186 A1 | 10/2007 | Ikeno et al. |
| 2007/0252804 A1 | 11/2007 | Engel et al. |
| 2007/0279500 A1 | 12/2007 | Castorina et al. |
| 2007/0296874 A1 * | 12/2007 | Yoshimoto et al. ........... 348/739 |
| 2008/0030672 A1 | 2/2008 | Lee et al. |
| 2008/0088649 A1 | 4/2008 | Ikeno et al. |
| 2008/0117231 A1 * | 5/2008 | Kimpe ..................... 345/629 |
| 2008/0231952 A1 * | 9/2008 | Kim ........................ 359/465 |
| 2008/0267527 A1 | 10/2008 | Berretty .................. 382/276 |
| 2008/0278574 A1 * | 11/2008 | Ramstad .................. 348/51 |
| 2009/0027384 A1 * | 1/2009 | Karman et al. ............. 345/419 |
| 2009/0066786 A1 * | 3/2009 | Landa ..................... 348/54 |
| 2009/0135009 A1 | 5/2009 | Kim |
| 2009/0142041 A1 * | 6/2009 | Nagasawa et al. ........... 386/124 |
| 2009/0146933 A1 | 6/2009 | Visser et al. |
| 2009/0147186 A1 | 6/2009 | Nakai et al. |
| 2009/0195641 A1 * | 8/2009 | Neuman ................... 348/47 |
| 2009/0284586 A1 * | 11/2009 | Ramstad .................. 348/60 |
| 2009/0284678 A1 | 11/2009 | Yang et al. |
| 2010/0080459 A1 | 4/2010 | Dai et al. |
| 2011/0002533 A1 * | 1/2011 | Inoue et al. ............... 382/154 |
| 2011/0043549 A1 | 2/2011 | Chestakov et al. |
| 2013/0215105 A1 | 8/2013 | Yonezu |

FOREIGN PATENT DOCUMENTS

| | | |
|---|---|---|
| AU | 6821901 | 12/2001 |
| CA | 2075807 | 1/1979 |
| CA | 2009960 | 8/1990 |
| CN | 1293805 | 5/2001 |
| CN | 1294695 | 5/2001 |
| DE | 2730785 | 1/1979 |
| DE | 29912074 | 11/1999 |
| DE | 19920789 | 5/2000 |
| EP | 0389123 | 9/1990 |
| EP | 454423 | 10/1991 |
| EP | 0460314 | 12/1991 |
| EP | 595387 | 4/1994 |
| EP | 0605945 | 7/1994 |

(56) References Cited

FOREIGN PATENT DOCUMENTS

| | | |
|---|---|---|
| EP | 0703563 | 3/1996 |
| EP | 0732669 | 9/1996 |
| EP | 0802684 | 10/1997 |
| EP | 0999088 | 5/2000 |
| EP | 1177527 | 11/2000 |
| EP | 1093008 | 4/2001 |
| EP | 1151430 | 11/2001 |
| EP | 1287401 | 3/2003 |
| FR | 2609941 | 7/1988 |
| GB | 2312584 | 10/1997 |
| GB | 2347003 | 8/2000 |
| GB | 2372618 | 8/2002 |
| JP | 61248083 | 11/1986 |
| JP | 63158587 | 7/1988 |
| JP | 3021902 | 1/1991 |
| JP | 3174580 | 7/1991 |
| JP | 3186894 | 8/1991 |
| JP | 3226095 | 10/1991 |
| JP | 3282586 | 12/1991 |
| JP | 4191755 | 7/1992 |
| JP | 4220691 | 8/1992 |
| JP | 4251219 | 9/1992 |
| JP | 5040449 | 2/1993 |
| JP | 6317488 | 11/1994 |
| JP | 8036375 | 2/1996 |
| JP | 8095741 | 4/1996 |
| JP | 09033858 | 2/1997 |
| JP | 9146751 | 6/1997 |
| JP | 9244057 | 9/1997 |
| JP | 9282357 | 10/1997 |
| JP | 9308769 | 12/1997 |
| JP | 10003355 | 1/1998 |
| JP | 10039821 | 2/1998 |
| JP | 10105829 | 4/1998 |
| JP | 10228347 | 8/1998 |
| JP | 10334275 | 12/1998 |
| JP | 11205822 | 7/1999 |
| JP | 11272846 | 10/1999 |
| JP | 200099237 | 4/2000 |
| JP | 2000142173 | 5/2000 |
| JP | 2000347645 | 12/2000 |
| JP | 200156675 | 2/2001 |
| JP | 2001100689 | 4/2001 |
| JP | 2001215332 | 8/2001 |
| JP | 2001324608 | 11/2001 |
| JP | 2002504764 | 2/2002 |
| JP | 2002099223 | 4/2002 |
| JP | 2002131775 | 5/2002 |
| JP | 2002350772 | 12/2002 |
| JP | 2002544544 | 12/2002 |
| JP | 2003507774 | 2/2003 |
| JP | 2003316335 | 11/2003 |
| KR | 10-2001-0034511 | 4/2001 |
| KR | 10-2002-0073054 | 9/2002 |
| KR | 10-2006-0124988 | 12/2006 |
| KR | 10-2007-0048143 | 5/2007 |
| KR | 10-2007-0073807 | 7/2007 |
| NO | 20005178 | 4/2001 |
| PL | 343229 | 4/2001 |
| WO | 88/05389 | 7/1988 |
| WO | 91/12554 | 8/1991 |
| WO | 98/47106 | 10/1998 |
| WO | 99/42889 | 8/1999 |
| WO | 9942889 | 8/1999 |
| WO | 99/44095 | 9/1999 |
| WO | 9945526 | 9/1999 |
| WO | 00/36578 | 6/2000 |
| WO | 00/48167 | 8/2000 |
| WO | 00/68887 | 11/2000 |
| WO | 01/01290 | 1/2001 |
| WO | 01/15127 | 3/2001 |
| WO | 01/15128 | 3/2001 |
| WO | 01/57799 | 8/2001 |
| WO | 01/95019 | 12/2001 |
| WO | 02/35277 | 5/2002 |
| WO | 02/084637 | 10/2002 |
| WO | 02/091033 | 11/2002 |
| WO | 03/003109 | 1/2003 |
| WO | 03/023491 | * 3/2003 |
| WO | 03/032058 | 4/2003 |
| WO | 03/040820 | * 5/2003 |
| WO | 2004/001488 | 12/2003 |
| WO | 2004/002143 | * 12/2003 |
| WO | 2004/102520 | 11/2004 |
| ZA | 9703025 | 11/1997 |

OTHER PUBLICATIONS

"Teamworkstation 1989-1994," http://web.media.mit.edu/~ishii/TWS.html, pp. 1-4, 1994.
"TEXTARC: An Alternate Way to View A Text," http://textarc.org, p. 1, 2002.
"TEXTARC: NYSCA Grant and Public Installation," http//textarc.org, p. 1, 2002.
"TEXTARC: The Print and the Artist," http://textarc.org, p. 1, 2002.
Clearboard 1991-1994, http://web.media.mit.edu/~ishii/CB.html, pp. 1-3, 1994.
Courter et al., Microsoft Office 2000 Professional Edition, Sybex Inc., pp. xxxi, 543, 685, 1999.
Harrison et al., "Transparent Layered User Interfaces: An Evaluation of a Display Design to Enhance Focused and Divided Attention" ACM, pp. 1-13 pages, 1995.
Ishii et al., "Iterative Design of Seamless Collaboration Media", Communications of the ACM, vol. 37, pp. 83-97, 1994.
Non-Final Office Action Mailed Mar. 29, 2006; U.S. Appl. No. 10/489,101.
Notice of Abandonment Mailed Jul. 16, 2007; U.S. Appl. No. 10/489,101.
Non-Final Office Action Mailed Jul. 28, 2005; U.S. Appl. No. 10/489,101.
Office Action Mailed Nov. 22, 2005; U.S. Appl. No. 10/489,101.
Non-Final Office Action Mailed Feb. 2, 2009; U.S. Appl. No. 10/519,285.
Office Action Mailed May 28, 2008; U.S. Appl. No. 10/519,285.
Non-Final Office Action Mailed Sep. 10, 2007; U.S. Appl. No. 10/519,2085.
Office Action Mailed Sep. 17, 2008; U.S. Appl. No. 10/519,285.
Office Action Mailed Jan. 11, 2010; U.S. Appl. No. 10/519,285.
Office Action Mailed May 25, 2010; U.S. Appl. No. 10/519,285.
Office Action Mailed Aug. 17, 2009; U.S. Appl. No. 10/519,285.
Office Action Mailed Feb. 24, 2009; U.S. Appl. No. 10/528,334.
Non-Final Office Action Mailed Aug. 5, 2008; U.S. Appl. No. 10/528,334.
Office Action Mailed Feb. 24, 2008; U.S. Appl. No. 10/528,334.
Non-Final Office Action Mailed Sep. 1, 2009; U.S. Appl. No. 10/528,334.
Office Action Maile Apr. 15, 2010; U.S. Appl. No. 10/557,157.
Non-Final Office Action Mailed Sep. 9, 2009; U.S. Appl. No. 10/557,157.
Non-Final Office Action Mailed Jan. 8, 2007; U.S. Appl. No. 10/841,133.
Office Action Mailed Aug. 7, 2008; U.S. Appl. No. 10/841,133.
Office Action Mailed Sep. 6, 2007; U.S. Appl. No. 10/841,133.
Non-Final Office Action Mailed Nov. 28, 2007; U.S. Appl. No. 10/841,133.
Office Action Mailed Oct. 27, 2010; U.S. Appl. No. 11/804,650.
Non-Final Office Action Mailed May 14, 2010; U.S. Appl. No. 11/804,650.
Non-Final Office Action Mailed Feb. 16, 2010; U.S. Appl. No. 12/107,589.
Office Action Mailed Jun. 25, 2010; U.S. Appl. No. 12/107,589.
Non-Final Office Action Mailed Aug. 12, 2009; U.S. Appl. No. 12/107,589.
Notice of Allowance Dated Sep. 14, 2012; U.S. Appl. No. 12/089,390.
Non-Final Office Action Dated Mar. 26, 2012; U.S. Appl. No. 12/089,390.

(56) References Cited

OTHER PUBLICATIONS

Non-Final Office Action Dated Mar. 19, 2012; U.S. Appl. No. 10/519,285.
Notice of Allowance Dated Dec. 9, 2011; U.S. Appl. No. 10/557,157.
Notice of Allowance Dated Nov. 23, 2011; U.S. Appl. No. 10/528,334.
Notice of Allowance Dated Jun. 27, 2012; U.S. Appl. No. 10/519,285.
Non-Final Office Action Dated Aug. 24, 2012; U.S. Appl. No. 11/804,650.
Non-Final Office Action Dated Jul. 30, 2012; U.S. Appl. No. 12/831,173.

* cited by examiner

METHOD AND SYSTEM FOR DISPLAYING IMAGES OF VARIOUS FORMATS ON A SINGLE DISPLAY

RELATED APPLICATIONS

The present application claims the benefit of New Zealand Patent Application Number 576977, filed May 14, 2009, and assigned to the assignee of the present invention, and also claims the benefit of Japanese Patent Application Number 2009-127521, filed May 27, 2009, and assigned to the assignee of the present invention. Each of these applications is incorporated herein by reference in their entirety and for all purposes.

BACKGROUND OF THE INVENTION

Electronic display technology for displaying graphical images and/or text has evolved dramatically to meet the pervasive user demand for more realistic and interactive displays. A wide range of display technologies with differing capabilities are now available including: cathode ray tube (CRT); bistable display; electronic paper; nixie tube displays; vector display; flat panel display; vacuum fluorescent display (VF); light-emitting diode (LED) displays; ELD; plasma display panels (PDP); liquid crystal display (LCD) such as HPA display and thin-film transistor displays (TFT); organic light-emitting diode displays (OLED); surface-conduction electron-emitter display (SED) (experimental); laser TV (forthcoming); carbon nanotubes (experimental); and nanocrystal displays (experimental) which use quantum dots to make vibrant, flexible screens.

Further adaptations have been made to achieve enhanced visual effects using this technology, e.g. Stereoscopic and Multi-Layer Displays (MLD). Stereoscopic and auto stereoscopic displays provide the appearance of a 3D image by providing slightly different visual images to the left and right eyes of the viewer to utilize the binocular capabilities of the human visual system.

MLD systems use multiple layered screens aligned parallel with each other in a stacked arrangement with a physical separation between each screen. Each screen is capable of displaying images. Thus, multiple images separated by a physical separation or "depth" can be displayed on one display. PCT Publication No. WO 99/42889 discloses such an MLD in which depth is created by displaying images on the background screen furthest from the viewer which will appear at some depth behind images displayed on the screen(s) closer to the user. The benefits of MLDs, in particular those utilizing the technology described in the PCT Publication Nos. WO 99/42889 and WO 99/44095 are gaining increasingly widespread recognition and acceptance due to their enhanced capabilities compared to conventional single focal plane displays (SLD).

The benefits of MLDs are especially germane to displays using liquid crystal displays (LCD), though MLDs can also be formed using other display technologies, e.g. an LCD front screen may be layered in front of an OLED rear screen.

There are two main types of Liquid Crystal Displays used in computer monitors, passive matrix and active matrix. Passive-matrix Liquid Crystal Displays use a simple grid to supply the charge to a particular pixel on the display. Creating the grid starts with two glass layers called substrates. One substrate is given columns and the other is given rows made from a transparent conductive material. This is usually indium tin oxide. The rows or columns are connected to integrated circuits that control when a charge is sent down a particular column or row. The liquid crystal material is sandwiched between the two glass substrates, and a polarizing film is added to the outer side of each substrate.

A pixel is defined as the smallest resolvable area of an image, either on a screen or stored in memory. Each pixel in a monochrome image has its own brightness, from 0 for black to the maximum value (e.g. 255 for an eight-bit pixel) for white. In a color image, each pixel has its own brightness and color, usually represented as a triple of red, green and blue intensities. To turn on a pixel, the integrated circuit sends a charge down the correct column of one substrate and a ground activated on the correct row of the other. The row and column intersect at the designated pixel and that delivers the voltage to untwist the liquid crystals at that pixel.

The passive matrix system has significant drawbacks, notably slow response time and imprecise voltage control. Response time refers to the Liquid Crystal Displays ability to refresh the image displayed. Imprecise voltage control hinders the passive matrix's ability to influence only one pixel at a time. When voltage is applied to untwist one pixel, the pixels around it also partially untwist, which makes images appear fuzzy and lacking in contrast. Active-matrix Liquid Crystal Displays depend on thin film transistors (TFT). Thin film transistors are tiny switching transistors and capacitors. They are arranged in a matrix on a glass substrate.

To address a particular pixel, the proper row is switched on, and then a charge is sent down the correct column. Since all of the other rows that the column intersects are turned off, only the capacitor at the designated pixel receives a charge. The capacitor is able to hold the charge until the next refresh cycle. And if the amount of voltage supplied to the crystal is carefully controlled, it can be made to untwist only enough to allow some light through. By doing this in very exact, very small increments, Liquid Crystal Displays can create a grey scale.

Most displays today offer 256 levels of brightness per pixel. A Liquid Crystal Display that can show colors must have three sub-pixels with red, green and blue color filters to create each color pixel. Through the careful control and variation of the voltage applied, the intensity of each sub-pixel can range over 256 shades. Combining the sub-pixel produces a possible palette of 16.8 million colors (256 shades of red×256 shades of green×256 shades of blue). Liquid Crystal Displays employ several variations of liquid crystal technology, including super twisted nematics, dual scan twisted nematics, ferroelectric liquid crystal and surface stabilized ferroelectric liquid crystal. They can be lit using ambient light in which case they are termed as reflective, backlit and termed transmissive, or a combination of backlit and reflective and called transflective.

There are also emissive technologies such as Organic Light Emitting Diodes, and technologies which project an image directly onto the back of the retina which are addressed in the same manner as Liquid Crystal Displays. These devices are described hereafter as LCD panels.

However, the adoption of many display content types, including display content for stereoscopic and MLD displays has been hampered by the need to custom-build computer software applications and display controllers to suit the particular display-type. For example, a user that has an MLD may be limited to using custom designed software and hardware controllers as the MLD software and controllers may not be able to display other types of display content correctly. Conversely, the MLD software and controllers are purpose-built for the MLD and thus images designed for an MLD generally cannot be displayed correctly on SLDs or stereoscopic displays.

SUMMARY OF THE INVENTION

It would thus be advantageous to provide a display and corresponding software/hardware capable of displaying multiple different display content types. It would also be advantageous to provide an improved means for displaying images and visual effects designed for one display type on another display type.

It is an object of the present invention to address the foregoing problems or at least to provide the public with a useful choice.

It is acknowledged that the term 'comprise' may, under varying jurisdictions, be attributed with either an exclusive or an inclusive meaning. For the purpose of this specification, and unless otherwise noted, the term "comprise" shall have an inclusive meaning—i.e. that it will be taken to mean an inclusion of not only the listed components it directly references, but also other non-specified components or elements. This rationale will also be used when the term "comprised" or "comprising" is used in relation to one or more steps in a method or process.

Further aspects and advantages of the present invention will become apparent from the ensuing description which is given by way of example only.

The following terminology will be used throughout the specification and the intended meaning of each term is described below.

It will be appreciated that as used herein, the term "image" may refer to any visible effect, including a graphical image, object, text, pattern, symbol, design, shadow or other visible effect. The term "image data" may refer to any information or data specifying an aspect, facet or parameter of an image or part thereof, e.g. position, size, shape, orientation, color, contrast, brightness, intensity, hue, position, shading, depth, or any other aspect facet or parameter. The term "manipulating", "manipulate" and "manipulation" may include conversion, duplication, interpretation, processing, deleting, copying, splicing, interlacing, transferring, transmitting, transposing and/or re-arranging of image data. The term "display content type" may refer to the type of display content which an image is displayed as, e.g., stereoscopic, 2D, 3D, 2D with depth cues, MLD effect, stereoscopic, auto-stereoscopic, holographic or any other type of display content. The term "display system" may refer to any display system including one or more electronic display layers capable of generating a visible image and may include, by way of example, one or more display layers formed from a: Cathode Ray Tube (CRT), Liquid Crystal Display (LCD), Organic Light Emitting Diode (OLED), Light Emitting Diode (LED), Plasma display panels (PDP), Surface-conduction electron-emitter display (SED), Laser TV, or any other known or future display technology.

According to one aspect of the present invention there is provided a method of manipulating input image data relating to an input image of a first display content type to generate an output image of a second display content type for display on a display system, the method including retrieving metadata specifying the second display content type, using a content engine to process the metadata and manipulate the input image data to generate the output image, and wherein the content engine outputs a data signal for generating the output image on the display system.

In one embodiment, the method can use a computer system which has a system memory coupled by a bus to a processor, and wherein the system memory stores computer readable instructions providing the content engine for manipulating the input image data and outputting the data signal.

The method may provide means for converting an input image of one display content type into an output image of another display content type by using metadata that specifies the second display content type and therefore how the image is intended to be displayed on the display system. The second display content type may be a visual effect applied to the first image (then displayed as the output image) to alter the visual appearance for entertainment, quality enhancement, information-conveyance or other purpose. Accordingly, the method may be used with one type of display system for viewing content designed for another type of display system, e.g. 2D images designed for a 2D display may be viewed as a multi layered image on an MLD.

Although the first and second display content types may be different in one embodiment, it should be appreciated that in some applications the first image may be displayed without alteration, e.g., the first image may be a stereoscopic image to be displayed as a stereoscopic image on the display system. In such applications, the content engine may be capable of manipulating the input image data such that the first and output images are of the same display content type, e.g., the first and second display content types are the same. Thus, in one embodiment, the content engine is configured such that no metadata is received and the content engine generates the output image in the first display content type. In one embodiment, the metadata may specify the output image is to be of the same display content type as the input image and the content engine is configured to generate the output image in the first display content type.

While reference herein has made to the input and output images in the singular, it should be appreciated that multiple input and output images may be used.

In one embodiment of the present invention, computer software includes a content engine for executing image data manipulation of input image data (e.g., relating to an input image of a first display content type) to generate an output image of a second display content type for display on a display system. The content engine may be embodied in computer-readable instructions including one or more image data manipulation algorithms which are executable to: process the input image data and metadata specifying the second display content type; and generate a data signal for generating the output image for display on the display system.

The metadata preferably specifies the second display content type such that the content engine can execute corresponding image data manipulation algorithms for generating a data signal with the output image. The metadata may "specify" the second display content type by including reference to a particular second display content type and/or a particular manipulation of the input image data. For example, in one embodiment, the metadata may designate pixels as being LEFT/RIGHT and/or FRONT/REAR pixels. The content engine can thus split the input image into LEFT/RIGHT and/or FRONT/REAR pixel groups and generate an output image data signal accordingly.

In one embodiment, the metadata may vary for each combination of the first and second display content types. For example, a 2D input image to be displayed as a multi-layered "output image" will be manipulated in a different way than a multi-layered input image to be displayed as a Stereoscopic output image.

In one embodiment, the first display content type may include one or more of the following display content types: 2D; 2D with depth map; 3D Object Data; multi-layered; stereoscopic; and enhanced color and/or contrast. In one embodiment, the second display content type may include one or more of the following display content types: 2D; 2D with depth map; 3D Object Data; multi-layered; stereoscopic; and enhanced color and/or contrast.

The content engine may include an image data manipulation algorithm for at least one combination of first and second display content types. Alternatively, the content engine may include an image data manipulation algorithm for a combination of first and second display content types. In one embodiment, the content engine may include a Hardware Identification Algorithm that automatically detects the type of display system and runs appropriate image data manipulation algorithms accordingly.

2D or two-dimensional images may be a conventional display content type which displays a 2D image on a display layer. The image data for forming a 2D image on a display layer may include the particular pixels forming the image and the visual characteristics, e.g., color, brightness etc. of those pixels.

2D images can also have "depth cues" applied to the image to give the appearance of depth. Such depth cues may include, by way of example, shading, perspective, motion parallax, relative size, occlusion (overlapping image blocking overlapped image), "distance fog," texture gradients or the like. A "2D depth cue" may be any 2D effect that provides a depth perception to a viewer and should not be seen to be limited to the examples provided herein. The depth cues applied to an image may form a "depth map" which provides a 2D map of the apparent depth of each part of the image.

The input image data may be provided in the form of 3D object data which may include not only the 2D information, e.g., x and/or y coordinate data, but also depth information (z-data), of particular image parts. The 3D object data may for example include voxel information of a 3D image. A 3D object can be displayed on a conventional 2D display screen using 3D simulation techniques such as depth cues as described above.

An MLD may include at least a first and second display layer, each capable of displaying an image using a first and second plurality of pixels, respectively. The first and second display layers may overlap and have at least a portion capable of being made substantially transparent such that a viewer can look through one of the display layers to view the other display layer.

In one embodiment, the first and second display layers may be referred to as "front" and "rear" display layers. However, it should be appreciated that the MLD may include more than two display layers and thus reference to "front" and "rear" should not be seen to be limiting. In one embodiment, the particular images displayed on the "front" and "rear" display layers may be interchangeable to achieve the same visual effect, e.g., the "front" and "rear" image (e.g., of enhanced color, enhanced contrast, stereoscopic display content type, etc. which is displayed using an MLD system) may be swapped while achieving a similar visual appearance.

The multi-layered display content type can therefore be used to show overlapping images on multiple overlapping layers. As the images displayed on the display layers are physically separated, images on the front display layer are closer to the viewer than images on the rear display layer. In addition to this multi-layered image effect, there are also numerous other visual effects achievable by using a MLD. For example, an MLD may be used to implement: a multi-layered Graphical User Interface (GUI) where different parts of the GUI are displayed on different display layers; Advanced White Silhouetting (AWS) as described in NZ patent application No. 570812; overall opacity control with alpha blending of back or front colored silhouette as described in PCT Publication No. WO 07/40413; 2D Gradient Blending which involves displaying parts of a 2D image on front and rear display layers to create an overlapping portion or "blending" of the image between the two display layers, where the ratio by which the image is split between front and rear display layers defines the gradient; 3D Gradient Blending which provides "Depth Fusion," e.g., a visual effect that uses depth information (z-axis) to display a volume object that appears "fused" or continuously extends between the front and rear display layers, as described in PCT Publication No. WO 03/40820; "jumping" which involves moving an image from the rear to front layers and/or vice versa (and optionally repeating) to draw the users attention to the image as described in PCT Publication No. WO 03/23491; perspective "jumping" which involves moving images between layers on portions which do not directly overlap (e.g., the images move to the other layers at an angle to provide perspective to emphasize the depth between layers); clear split where images on different display layers do not overlap; separate image overlays where an annotation or other descriptor overlaps an image on another display layer; masking visible MLD Area which involves providing localized areas of multi-layered images on the display system to provide a visual appearance that these areas are "deeper" than the rest of the display; layered distortion effects including lens effects, fish eye lens, magnifying effects, reflections and shadowing, etc.; layered particle effects where small pixel images are dispersed across the front and/or rear display layers to provide an enhanced perceived volumetric appearance of the images displayed; suggestive volume techniques which involve using conventional depth cues (e.g., shading) in combination with layering to convey a greater perception of depth; enhanced color and/or contrast control as described in PCT Publication No. WO 04/002143; multi view where the images on the front and rear display layers are displayed such that they can only be viewed from different viewing angles as described in PCT Publication No. WO 04/036286.

In one embodiment, an MLD using LCD panels may have a rear display panel having front and rear polarizers while the front display panel only has a front polarizer. This configuration can reduce light loss through the display relative to where the front display layer also has a rear polarizer but produces a negative of the output image. To compensate, the display controller may feed a negative of the output image to the front display panel, the resultant image therefore being a positive image. However, negative images generated for such a display may not display correctly on other MLD systems that do have such a rear polarizer.

Therefore, the content engine may include an "image inversion" image data manipulation algorithm executable to manipulate the input image data to generate an output image that is a negative of the input image. The content engine may thus execute such an "image inversion" image data manipulation algorithm where the display system produces a negative/positive output image of a positive/negative input image.

It should be appreciated that any of the visual effects described herein can be considered a display content type for the purpose of this specification. Accordingly, the terms "multi-layered," "multi-layered display content" or the like may include one or more of the visual effects described herein.

The stereoscopic display content type creates an illusion of depth by using a pair of two-dimensional (2D) images that are slightly different to each other to correspond to the different perspectives as would normally be seen of the left and right eye of the viewer of an equivalent 3-Dimensional (3D) object. Different parts of the image thus appear to be at different depths depending on the difference in each part of the components of the left and right eye images.

The differences in the pair of images may be created in a number of ways. For example, color anaglyph may be used to color the image in different colors depending on whether that part of the image is to be viewed by the left or right eye. This method requires the viewer to wear glasses with complementary colored filters for left and right eyes. Alternatively, polarizing filters may be used to polarize light corresponding to left and right eye images. A viewer wears glasses with left and right eye polarized lenses corresponding to the left and right eye images.

In one embodiment, the stereoscopic display content type may be an auto-stereoscopic display content type. Auto-stereoscopic displays do not require the viewer wears glasses as they use a lenticular lens or parallax barrier to split the left and right eye components in slightly different directions. A parallax barrier or mask may be placed over an interlaced image to block light from the left image to the right eye and vice versa.

It should be appreciated that reference herein to "stereoscopic" also includes "auto-stereoscopic" and vice versa.

In an MLD display system, an image may be displayed as a stereoscopic display content type by using the front or rear display layer as a parallax barrier and respectively displaying an interlaced image on the rear or front display layer. The parallax barrier may be formed by the pixels of the front/rear display layer selectively blocking light at different viewing angles to the left and right parts of the image on the rear/front layer. A "light barrier" can be formed using the rear display layer to achieve the same effect as a front parallax barrier. In one embodiment, a light barrier formed using the rear display layer may be used to provide improved clarity since the diffusion layer between the front and rear display layers may produce less diffusion of the resultant image.

The degree of separation between the front and rear display layers can affect the angle between the left and right image components for a given angle of light divergence from the rear display layer. The angle of divergence can also affect the "optimum" viewing position of the stereoscopic display system, e.g., where the viewer is positioned such that left and right eye image components intersect the left and right eyes of the viewer. This "optimum" viewing position can be determined by the thickness and phase difference of the parallax/light barrier, the spacing between the display layers and/or the spacing between left and right eye components of the interlaced image.

In one embodiment, a content engine includes a "stereo-spacing" image data manipulation algorithm executable to process MLD data and determine the spatial separation between front and rear display layers. Spacing data may be output which specifies the spacing between left and right eye components of the output image. Such a stereo-spacing image data manipulation algorithm thus provides a means for determining the separation between left and right eye image components for a given separation between display layers of an MLD system.

Enhanced color and/or contrast refers to techniques using an MLD system to achieve a color gamut and/or contrast that is higher than a comparable single image. For example, color of a first image may be improved by displaying a second image behind the first image, where the second image is essentially a duplicate of the first image but may have no black pixels and/or may be "blurred" to reduce interference effects. The output image presented to the viewer thus appears to be a single image with an "enhanced" level of color since the light effectively travels through two pixels of the same color.

As another example, contrast of a first image may be improved by displaying a second image behind the first image, where the second image is essentially a grayscale duplicate of the first image. The resultant image thus appears to be a single image with an "enhanced" level of contrast.

As yet another example, both effects can be combined by displaying a second image behind a first image, where the second image is a combined grayscale and blurred color "copy" of the first image. Accordingly, the resultant image may have enhanced color and enhanced contrast.

The enhanced color and/or enhanced contrast technique can be used on any Multi-Layered Display with two overlapping display layers and can be used to enhance the color and/or contrast of an output image of the MLD display content type described above.

In one embodiment, a computer system is operable to manipulate input image data relating to a first display content type to generate an output image of a second display content type for display on a display system. The computer system may include a system memory coupled by a bus to a processor, wherein the system memory stores instructions providing a content engine capable of manipulating the input image data. The content engine can be configured to receive metadata and the input image data, the metadata specifying the second display content type. The content engine can process the metadata and manipulate the input image data accordingly to generate a data signal for generating the output image for display on the display system.

In one embodiment, a display system includes a display layer capable of displaying an image. The display system also includes a computer system as aforementioned, wherein the computer system is operable to process the input image data and the metadata to generate a data signal for generating the output image for display on the display layer. Additionally, the display system is capable of displaying the output image as one or more of the following display content types: 2D; 2D with depth map; 3D Object Data; stereoscopic; Multi Layered; and enhanced color and/or contrast.

The display system can therefore be used to display images of various different display content types without requiring the image data of each image to be specifically designed for the display system. Thus, the display system can be used to display images designed for different display content types. And in one embodiment, the display system is capable of simultaneously displaying at least two images of differing display content types.

The display system may be any type of display system, e.g., a single layered display (SLD), stereoscopic display, volumetric display, another type of 3D display, etc. In one embodiment, the display system is a multi-layer display (MLD) including at least a first and second display layer, where the first and second display layers overlap and have at least a portion capable of being made substantially transparent such that a viewer can look through one display layer to view the other display layer.

The first and second display layers may respectively include a first and second plurality of pixels operable to display images using at least some of the first and/or second plurality of pixels. And in one embodiment, the display system may include further display layer(s), where the first display layer and/or the second display layer overlap the further display layers.

The MLD system can therefore be used to display images of each of the various different display content types without requiring the image data of each image to be specially designed for the MLD system. In one embodiment, the MLD system is capable of simultaneously displaying images of at least two display content types. Thus, the MLD system can be used to display images designed for different and/or conventional display content types, e.g., stereoscopic, 2D or simulated 3D images. Furthermore, as the MLD system can be capable of simultaneously displaying the images in all of the aforementioned display content types, the MLD system thus offers enhanced visual effects over conventional single layer displays which are generally only capable of displaying 2D or stereoscopic images.

In one embodiment, a multi-layer display (MLD) system may include at least a first and second display layer, each capable of displaying an image using a first and second plurality of pixels respectively, the first display layer overlapping the second display and having at least a portion capable of being made substantially transparent such that a viewer can look through the overlapping first display layer to view the second display layer. The MLD system may also include a computer system for manipulating input image data relating to a first display content type to generate an output image of a second display content type for display on the MLD system. The computer system may include a memory coupled to a processor, wherein the memory stores instructions providing a content engine capable of manipulating the input image data. The content engine can be configured to receive metadata and the input image data, the metadata specifying the second display content type. The content engine can also be configured to process the metadata and manipulate the input image data accordingly to generate a data signal for generating the output image for display on the MLD system.

The MLD system may be capable of displaying the output image as one or more of the following display content types: 2D; 2D with depth map; 3D Object Data; stereoscopic; Multi Layered; and enhanced color and/or contrast. In one embodiment, the MLD system may be capable of simultaneously displaying at least two images of differing display content types in contrast to conventional display systems capable of displaying only a single display content type. Therefore, since the MLD system is capable of simultaneously displaying images of one or more display content types, the MLD system is more adaptable and offers viewers an enhanced visual experience comparable to conventional display systems.

In one embodiment, the content engine may includes or may be embodied in a Hardware Abstraction Layer (HAL) capable of processing the metadata and outputting a data signal in a form readable by the display system to display the output image. As the metadata specifies the second display content type and the manipulation required, the HAL can act as an interface between the particular display type used and the input image data, regardless of the form of the input image data or the display type.

The HAL may generate an output image including front and rear images for display on front and rear display layers respectively of an MLD system. Additionally, the HAL can be configured to process the metadata to split components of the input image data into the front and rear images as specified by the metadata. As the metadata can specify which images or image parts are displayed on each of the first and second display layer, the HAL can be used to display images correctly on differing types of MLD systems, e.g., with a different display layer separation, depth, polarizer, diffuser configuration or display layer relationship.

In one embodiment, the HAL may include one or more image data manipulation algorithms executable to receive image data relating to an image configured for display on a first MLD system with a first hardware parameter, and also receive hardware parameter information of a second MLD system with a second hardware parameter, where the second hardware parameter is different than the first hardware parameter. The image data manipulation algorithms may also be executable to process the image data to display the image on the second MLD system. The hardware parameter (e.g., of the first MLD system and/or the second MLD system) may include one or more of: spacing between display layers; level of light diffusion through display layers; polarization though a display layer(s); color profiles of a display layer(s); whether the display layers are being treated as end-on-end or side-by-side; and whether the display layers are treated as two separate displays or one combined display.

The collective parameter set (e.g., including at least two hardware parameters) of a given MLD system may be referred to as a hardware "profile." Thus, in one embodiment, the one or more image data manipulation algorithms may be executable to receive image data relating to an image configured for display on a first MLD system with a first hardware profile, and also receive hardware profile information of a second MLD system with a second hardware profile, the second hardware profile different to the first hardware profile. The one or more image data manipulation algorithms may also be executable to process the image data to display the image on the second MLD system. Accordingly, the HAL may effectively "de-couple" the input image data from the particular hardware that the input image data was designed for.

In one embodiment, the HAL may include a Hardware Identification Algorithm that automatically detects the type of display system and runs appropriate image data manipulation algorithms accordingly.

Examples of first display content types and, for each, an exemplary input image data manipulation performed by the content engine to generate the output image of the second display content type, are set out in Table 1.

TABLE 1

| First Display Content Type | Second Display Content Type | Metadata | Input Image Data Manipulation |
|---|---|---|---|
| 2D content | Multi Layered | Metadata specifies: Which parts of the input image are to be displayed on first and second (e.g. front and back) display layers. | Content Engine includes image data manipulation algorithm executable to process the metadata and input image data to: Separate the input image data into two portions corresponding to the front and back parts of the input image. |

TABLE 1-continued

| First Display Content Type | Second Display Content Type | Metadata | Input Image Data Manipulation |
|---|---|---|---|
| 2D content | Stereoscopic | Metadata specifies: The apparent depth of each part of the input image and therefore the left and right eye images. | Content Engine includes image data manipulation algorithm executable to process the metadata and input image data to: Generate left and right eye stereo pairs of images. |
| Multi Layered | 2D | Metadata specifies: The front and back input images and may also include depth information. | Content Engine includes image data manipulation algorithm executable to process the metadata and input image data to: Merge the front/back input image pairs to form a single output image. Multi-Layered depth effects may be emulated using depth cues. |
| Multi Layered | Stereoscopic | Metadata specifies: The front and back input image pairs. | Content Engine includes image data manipulation algorithm executable to process the metadata and input image data to: Create left/right stereo output image pairs from front/back input image pairs to emulate discreet layers for stereoscopic display system. |
| Stereoscopic | Multi Layered | Metadata specifies: Left and right stereo input image pairs | Content Engine includes image data manipulation algorithm executable to process the metadata and input image data to: Create depth information from left/right stereo input image pairs and create front/back output image pairs. |
| 2D Content | Multi-Layered (e.g., using one polariser between display layers, etc.) | Metadata specifies: 2D Enhancement (e.g. enhanced color, enhanced contrast, etc.) and/or Pixel Polarization | Content Engine includes "image inversion" image data manipulation algorithm executable to process the metadata and input image data to: Generate an output image that is a negative of the input image. |

In one embodiment, a method may be used to manipulate input image data relating to an input image of a first display content type to generate an output image of a second display content type for display on a display system. The method may be performed using a computer system which has a memory coupled to a processor, and wherein the memory stores computer-readable instructions providing a development environment capable of creating metadata. The method may include creating metadata relating to the input image data, where the metadata may specify the second display content type.

In one embodiment, a method may be used to manipulate input image data relating to an input image of a first display content type to generate an output image of a second display content type for display on a display system. The method may be performed using a computer system which has a memory coupled to a processor, and wherein the memory stores computer readable instructions providing a development environment capable of creating metadata relating to the input image data and a content engine capable of manipulating the input image data. The method may include creating metadata relating to the input image data, where the metadata may specify the second display content type. The method may also include retrieving the metadata and the input image data. The method may further include using the content engine to process the metadata and manipulate the input image data to generate the output image, wherein the content engine is capable of outputting a data signal for generating the output image on the display system.

In yet another embodiment, computer software may include a development environment for creating metadata relating to input image data of an input image of a first display content type, where the metadata may specify a second display content type for an output image to be displayed on a display system. The development environment may be embodied in computer-readable instructions and may include a user interface capable of receiving user input specifying the second display content type for a the input image or part thereof. The development environment may also include a metadata encoding algorithm which may be executable to create the metadata based on the user specification of the second display content type.

The metadata encoding algorithm may be capable of creating metadata for each display content type specifying how the input image data is to be manipulated to generate the output image. The development environment may thus provide a means for the user to create the metadata by indicating the second display content type they require and therefore the visual effect applied to the output image presented to the viewer of the display system.

In one embodiment, the development environment may include a display content type identification algorithm for automatically identifying the first display content type. As such, responsive to the user specifying the second display content type, the metadata encoding algorithm(s) will create the correct metadata for the display content type. Alternatively, responsive to the user may manually specifying the first display content type via the user interface, the metadata encoding algorithm(s) may create the correct metadata for the display content type.

In one embodiment, the content engine and/or development environment may be stored on a computer-readable medium. And in one embodiment, a data signal may be generated by a computer system as aforementioned.

In one embodiment, a method of displaying an image on a display system includes receiving the data signal generated by the content engine. The method may also include operating the display system to display the output image of the second display content type.

BRIEF DESCRIPTION OF THE DRAWINGS

Further aspects of the present invention will become apparent from the following description which is given by way of example only and with reference to the accompanying drawings.

DETAILED DESCRIPTION OF THE INVENTION

Figure 1:
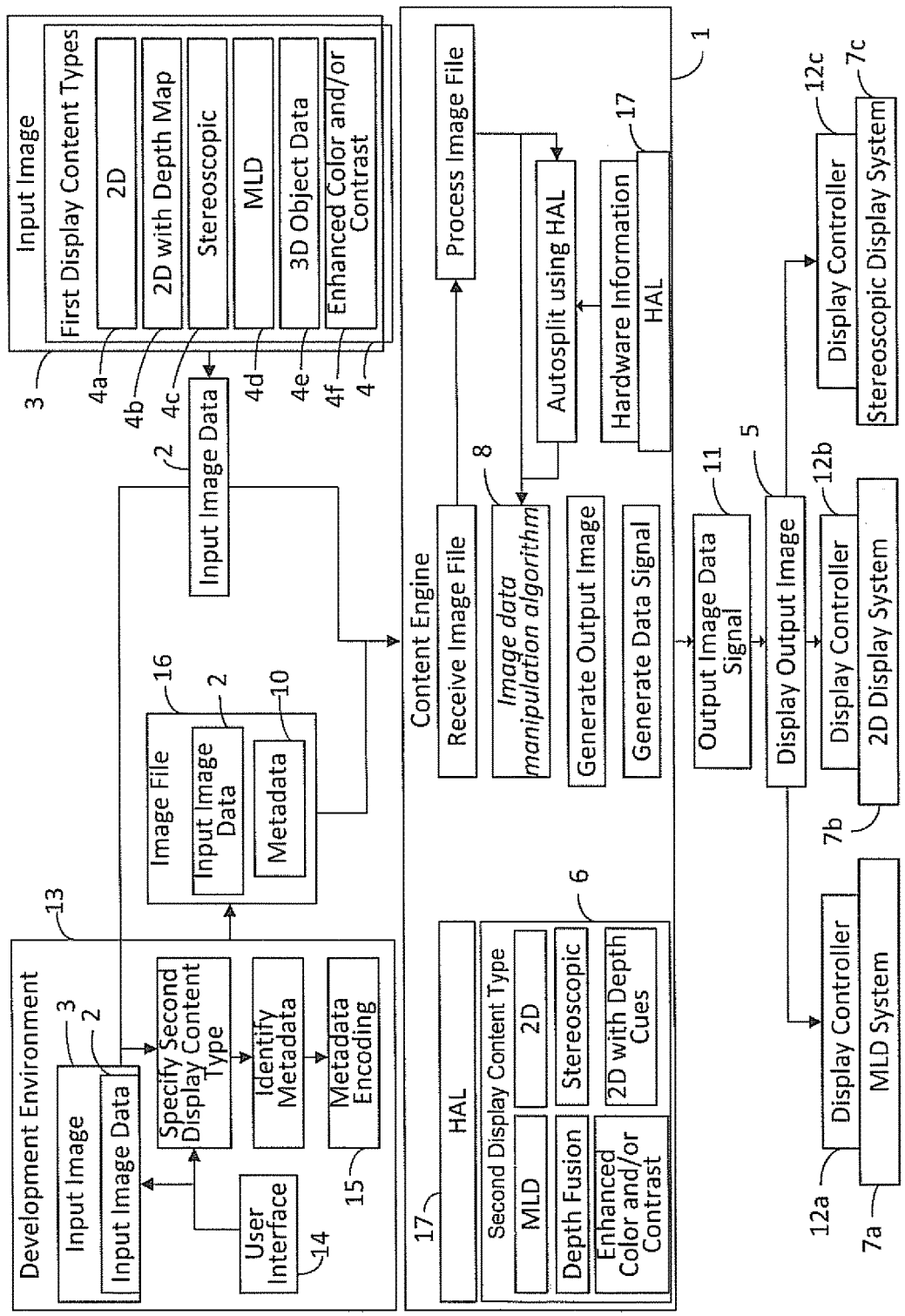
FIG. 1 shows a schematic process diagram of a method of manipulating image data.

FIG. 1 shows a schematic process diagram of a method of manipulating image data in accordance with one embodiment of the present invention. The method may be performed by computer software that runs on a computer system which has a memory coupled to a processor, where the computer software may be stored in the memory.

As shown in FIG. 1, a content engine (1) is operable to execute image data manipulation of input image data (2) relating to an input image (3) of a first display content type (4) to generate an output image (5) of a second display content type (6) for display on a display system (7a, 7b or 7c). The content engine (1) can be embodied in computer-readable instructions including an image data manipulation algorithm (8), executable to process the input image data (2) and metadata (10) associated with the input image data (2), the metadata (10) specifying the second display content type (6). The content engine (1) may also generate a data signal (11) for generating the output image (5) for display on the display system (7a, 7b or 7c). A display controller (12a, 12b, 12c) of the display system (7a, 7b, 7c) can receive the data signal (11) and render the output image (5) on the display system (7a, 7b, 7c). Alternatively, the content engine (1) may also include or operate as a display controller (12a, 12b, 12c) for the display system (7a, 7b, 7c).

In one embodiment, metadata (10) may be generated by a development environment (13). The development environment (13) may be provided as an independent software module to the content engine (1) and may include a user interface (14) capable of receiving user input specifying the second display content type (6) which the input image (3) is to be displayed as. The user of the development environment (13) may use an existing input image (3) or create the input image data (2) in the development environment (13) via the user interface (14). The development environment (13) may also have a metadata encoding algorithm (15) which is executable to create the metadata (10) based on the user specification of the second display content type (6).

The development environment (13) may output an "image file" (16) which may contain the input image data (2) and encoded metadata (10). The image file (16) may also contain executable scripts or be sent to the content engine in parallel with such executable scripts which the content engine may run to manipulate the input image data (2) and/or metadata (10) or perform another function. Metadata (10) may vary with the different types of input image data (2), the first and second display content types and any other effects or processes that need to be applied.

The development environment (13) optionally has a display content type identification algorithm which automatically identifies the first display content type (4) by processing the input image data (2). The metadata encoding algorithm (15) can thus use the information created by the display content type identification algorithm to apply the correct metadata to achieve the desired conversion of one display content type to another. In one embodiment, the user may specify the second display content type (6) and the metadata encoding algorithm (15) will automatically create the correct metadata for the display content type. Alternatively, the user may manually specify the first display content type via the user interface (15).

The first display content type (4) and second display content type (6) may be the same or different. Additionally, the first content type (4) and/or the second display content type (6) may be specified by the metadata (10) in one embodiment. Alternatively, the content engine (1) is capable of receiving input image data (2) without metadata (10).

In one embodiment, the input and output images may have the same display content type. As such, the input image may be displayed as the "output image" in an unaltered state.

Three examples of a display system are shown in FIG. 1 and include a Multi Layered Display (MLD) system (7a), a Single Layered Display (SLD) system (7b) and a 3D Display system (7c). The 3D Display system (7c) may be a stereoscopic display in one embodiment. The particular display system (7a, 7b, 7c, etc.) used may be determined by a user's requirements, by a display content type of the input image, by a display content type of the output image, some combination thereof, etc.

Each display system (7a, 7b, 7c) includes at least one display layer capable of displaying an image and is connected to the computer system via a wired, wireless or any communication channel capable of carrying a data signal. The display layer(s) may be LCD panels or some other type of display technology. The SLD system may include a single display layer capable of displaying images, e.g., an LCD, OLED or Plasma Display panel. The '3D' Stereoscopic display system (7c) may include a display layer (LCD, OLED, Plasma display panel, etc.) with a parallax barrier, lenticular lens or the like, overlaying the display layer and may be capable of displaying a stereoscopic image and/or an auto-stereoscopic image.

The MLD system (7a) includes a plurality of overlapping display layers. In one embodiment, one or more of the display layers may be formed from LCD panels. Each of the display layers includes a respective array of pixels operable to display a respective image on each of the display layers. Where a first display layer is placed in front of a second display layer, the pixels of the front display layer can be made substantially transparent so that a viewer can look through the first display layer to view the second display layer and any images displayed thereon.

The SLD system (7b) may include a single display layer. Accordingly, the SLD system (7b) may display 2D images and/or 2D images with depth cues (e.g., shading, perspective, etc.).

In one embodiment, the MLD system (7a) may display any of the display content types described herein, e.g., 2D, 2D with depth map, stereoscopic, auto-stereoscopic, multi-layered, enhanced color, enhanced contrast, etc. The MLD system (7a) can therefore be used to display images of various different display content types without requiring the image data of each image to be specifically designed for the MLD system (7a).

The MLD system (7a) is also capable of simultaneously displaying images of different display content types. For example, a first auto-stereoscopic image, a second multi-layered image and a third image with enhanced color and/or contrast may be simultaneously displayed using the MLD system (7a).

As shown in FIG. 1, the first display content type (4) may include any of the following display content types: 2D (4a); 2D with depth map (4b); stereoscopic (4c); Multi-Layered (4d); 3D Object Data (4e); and enhanced color and/or contrast (4f). In one embodiment, the input image data (2) may relate to an input image (3) of a first display content type (4). Additionally, the second display content type (6) may include any of the following display content types: 2D; 2D with depth map; stereoscopic; Multi-Layered; 3D Object Data; and enhanced color and/or contrast.

Where an MLD system (7a) is used as the display system, the content engine (1) may be also embodied in a Hardware Abstraction Layer (HAL) (17) and may be capable of outputting an output image (5) including first and second images for display on first and second display layers respectively of the MLD system (7c). The HAL (17) can be configured to read the metadata (10) and process the input image data (2) to split appropriate components of the input image data (2) into the first and second display layer images as specified by the metadata (10). As the metadata (10) specifies the second display content type (6) and the manipulation required, the HAL (17) can thus act as an interface between the particular MLD system used and the input image data (2), regardless of the form of the input image data (2) or hardware profile. Further, where the metadata (10) specifies which images or image parts are displayed on each of the first and second display layers, the HAL (17) can also be used to display images correctly on MLD systems with different hardware profiles.

Examples of the various display content types described above are shown in FIGS. 2 through 4. The metadata (10) specifies the second display content type (6) and also how the input image data (2) is to be manipulated to generate the output image (5). As an example, some of the manipulation methods to achieve the conversions between display content types are set out in Table 1 (described above).

FIGS. 2a through 2d show various display content types displayed on an MLD system (7a). As described in Table 1, the metadata (10) for an MLD system (7a) can specify which part of the input image(s) is to be displayed on each of the front and back display layers. FIGS. 2a through 2d thus show the front (5a) and back (5b) pairs of images for each display content type.

Figure 2A:
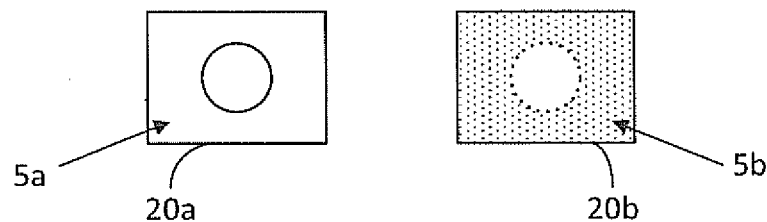
FIGS. 2a-d respectively show pictorial diagrams of some of the different display content types capable of being displayed on an MLD.

FIG. 2a shows a multi-layered output image formed from a front image (5a) and a rear image (5b) displayed on a front display layer (20a) and a rear display layer (20b), respectively, of an MLD system (7a). In one embodiment, the front image (5a) and/or the rear image (5b) may be manipulated to provide an Advanced White Silhouetting (AWS) effect. As such, simultaneous display of the front image (5a) and the rear image (5b) may create an Advanced White Silhouetting (AWS) effect.

Figure 2B:
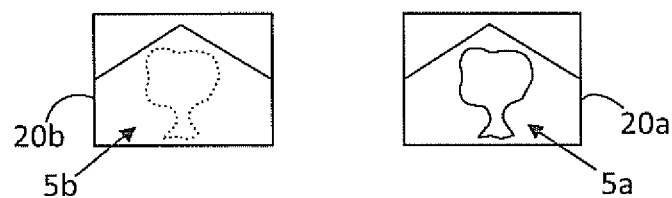

FIG. 2b shows an enhanced color and/or contrast image formed from a front image (5a) and a rear image (5b) displayed on a front display layer (20a) and a rear display layer (20b), respectively, of an MLD system (7a). In one embodiment, the rear image (5b) may be a blurred copy of the front image (5a).

Figure 2C:
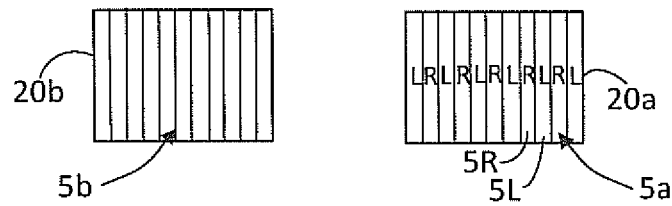

FIG. 2c shows a stereoscopic output image formed by generating a light barrier pattern (5b) on the rear display layer (20b) and generating an image (5a) on the front display layer (20a) composed of interlaced left eye components (5L) and right eye components (5R).

Figure 2D:
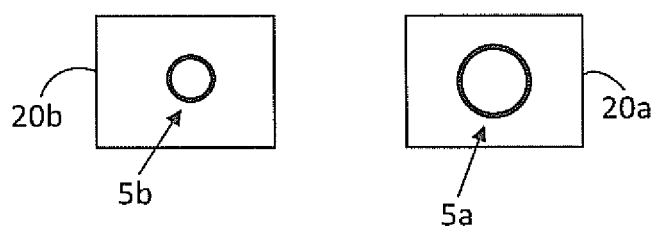

FIG. 2d shows an output image with a depth fusion visual effect formed by displaying a front image (5a) with a boundary having a reverse image gradient to an overlapped rear image (5b).

FIGS. 3a through 3d show various display content types on a SLD system (7b). As described in Table 1, the metadata (10) for an SLD system (7b) may specify the depth information which is to be emulated in the 2D image displayed on the SLD system (7b).

Figure 3A:
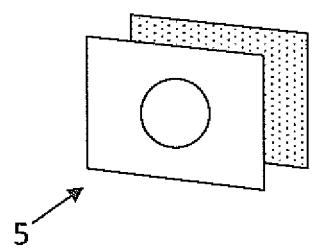
FIGS. 3a-d respectively show pictorial diagrams of some of the different display content types capable of being displayed on a SLD.

FIG. 3a shows a 2D output image (5) generated based on a multi-layered input image. In one embodiment, the multi-layered input image may be manipulated to generate the 2D output image (5), where the manipulation of the multi-layered input image may involve applying or using at least one depth cue to emulate the layering of the multi-layered image.

Figure 3B:
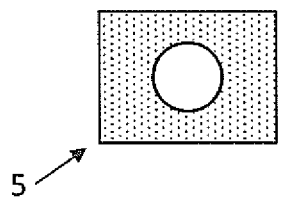

FIG. 3b shows a 2D output image (5) generated based on an enhanced color and/or contrast input image. In one embodiment, the 2D output image (5) may be left unaltered. And in one embodiment, the color and/or contrast of the 2D output image (5) may be improved using conventional image processing techniques.

Figure 3C:
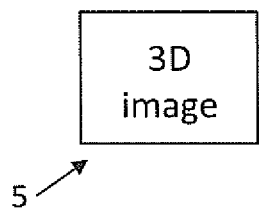

FIG. 3c shows a 2D output image (5) generated based on a stereoscopic input image. In one embodiment, the stereoscopic input image may be manipulated to generate the 2D output image (5), where the manipulation of the stereoscopic input image may involve emulation of the stereoscopic effect using conventional pseudo-3D techniques.

Figure 3D:
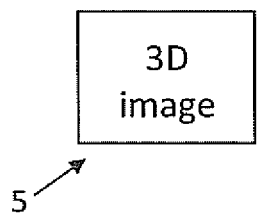

FIG. 3d shows a 2D output image (5) generated based on an input image with the depth fusion visual effect. In one embodiment, the input image may be manipulated to generate the 2D output image (5), where the manipulation of the input image may involve emulation of the depth fusion visual effect using conventional pseudo-3D techniques.

FIGS. 4a through 4d show various display content types on a stereoscopic display system (7c). As described in Table 1, the metadata (10) for a stereoscopic display system (7*c*) may specify the left and right eye image information as an image pair (e.g., a left image (5L) and a right image (5R)). In one embodiment, the image pair (e.g., left image (5L) and right image (5R)) may be displayed as an interlaced image on the same display layer of the stereoscopic display system (7*c*).

Figure 4A:
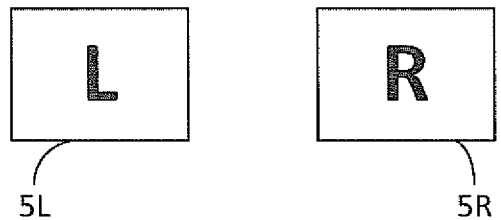
FIGS. 4a-d respectively show pictorial diagrams of some of the different display content types capable of being displayed on a 3D (stereoscopic) display system.

FIG. 4*a* shows a right image (5R) and a left image (5L) generated based on a multi-layered input image. The right image (5R) and the left image (5L) may be generated such that the layered depth information of the multi-layered input image is emulated as discrete image planes formed in the stereoscopic output image (5).

Figure 4B:
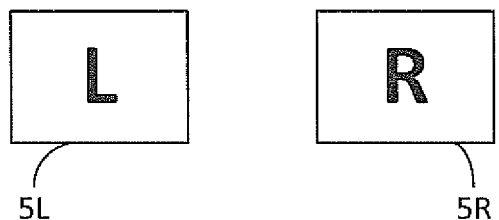

FIG. 4*b* shows a right image (5R) and a left image (5L) generated based on an enhanced color and/or contrast input image. In one embodiment, the color and/or contrast of the stereoscopic output image (5) may be improved using conventional image processing techniques.

Figure 4C:
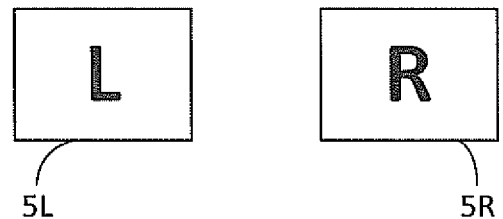

FIG. 4*c* shows a right image (5R) and a left image (5L) generated based on a stereoscopic input image. In one embodiment, the right image (5R) and the left image (5L) may be generated from the stereoscopic input image without any manipulation.

Figure 4D:
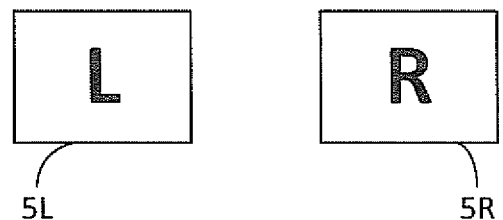

FIG. 4*d* shows a right image (5R) and a left image (5L) generated based on an input image with a depth fusion visual effect. In one embodiment, the input image may be manipulated to generate the right image (5R) and the left image (5L), where the manipulation of the input image may involve emulation of the depth fusion visual effect using conventional image processing techniques.

Figure 5A:
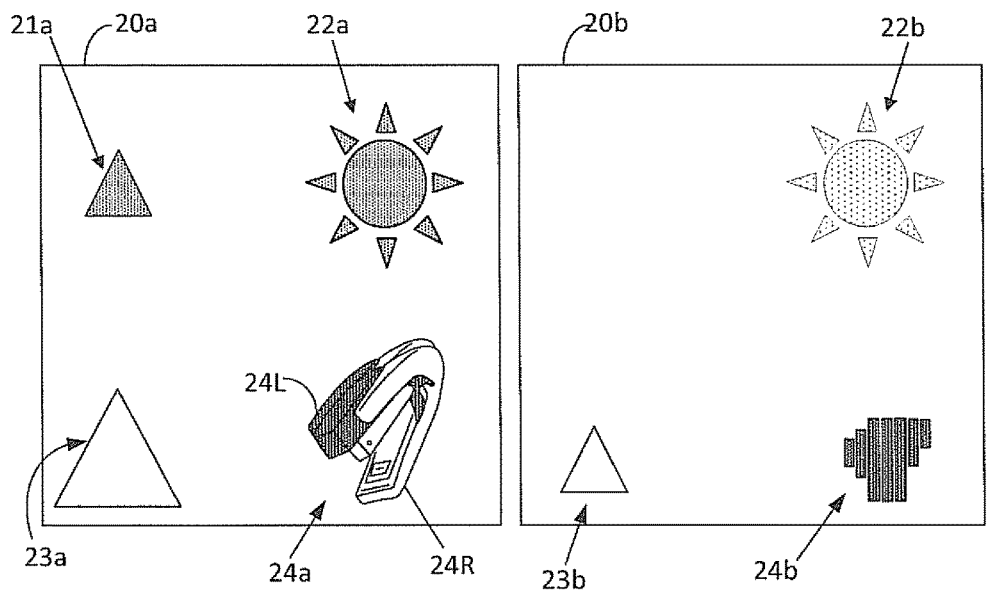
FIG. 5a shows a MLD system according to one embodiment of the present invention with two overlapping display layers.
Figure 5B:
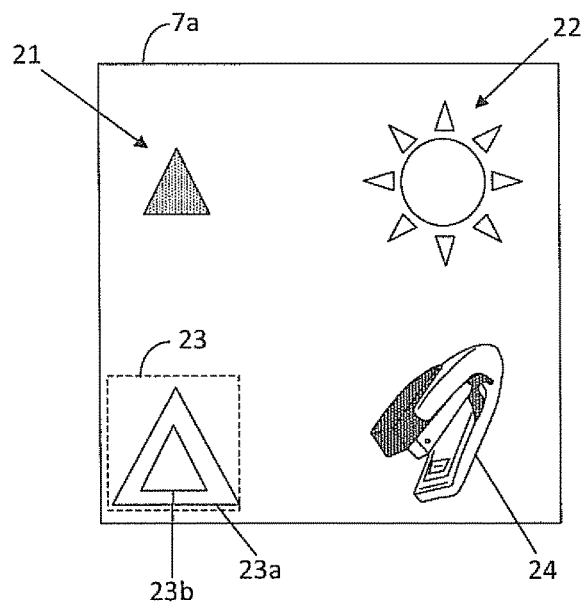
FIG. 5b shows the MLD system of FIG. 5a with the display layers non-overlapping to show the Constituent images.

As shown in FIG. 5*a*, the MLD system (7*a*) includes a front display layer (20*a*) and a rear display layer (20*b*). The front display layer (20*a*) can display a front image (e.g., 21*a*, 22*a*, 23*a*, 24*a*, etc.), whereas the rear display layer (20*b*) can display a rear image (e.g., 22*b*, 23*b*, 24*b*, etc.). The front and rear images can be displayed simultaneously to form a multi-layered output image (5), which is depicted in FIG. 5*b* as a 2D image (21), an enhanced color and/or contrast image (22), a Multi-Layered image (23), a stereoscopic image (24).

The 2D output image (21) may be formed by displaying a front image (21*a*) on front display layer (20*a*). The front image (21*a*) may use shading as a depth cue.

The enhanced color and/or contrast image (22) may be formed by displaying a front image (22*a*) on the front display layer (20*a*) and a rear image (22*b*) on the rear display layer (20*b*). In one embodiment, the front image (22*a*) may overlap the rear image (22*b*). And in one embodiment, the rear image (22*b*) may be a blurred color or grayscale copy of the front image (22*a*).

The multi-layered image (23) may be formed by displaying a front image (23*a*) on the front display layer (20*a*) and a rear image (23*b*) on the rear display layer (20*b*). In one embodiment, the front image (23*a*) may overlap the rear image (23*b*).

The stereoscopic image (24) may be formed by displaying a front image (24*a*) on the front display layer (20*a*) and a rear image (24*b*) on the rear display layer (20*b*). The front image (24*a*) may be an interlaced image including a right image (24R) and a left image (24L), where right image (24R) includes right eye components and left image (24L) includes left eye components. The rear image (24*b*) may form a localized light barrier or parallax barrier. In one embodiment, rear image (24*b*) may be displayed on the front display layer (20*a*) and front image (24*a*) may be displayed on the rear display layer (20*b*).

As shown in FIG. 5*b*, the MLD system (7*a*) is capable of displaying images of different display content types. For example, MLD system (7*a*) can display a 2D image (21), an enhanced color and/or contrast image (22), a Multi-Layered image (23), a stereoscopic image (24), some combination thereof, etc. In one embodiment, the MLD system (7*a*) may simultaneously display images of different display content types. Accordingly, the MLD system (7*a*) is more adaptable and offers viewers an enhanced visual experience compared to conventional display systems.

Figure 6:
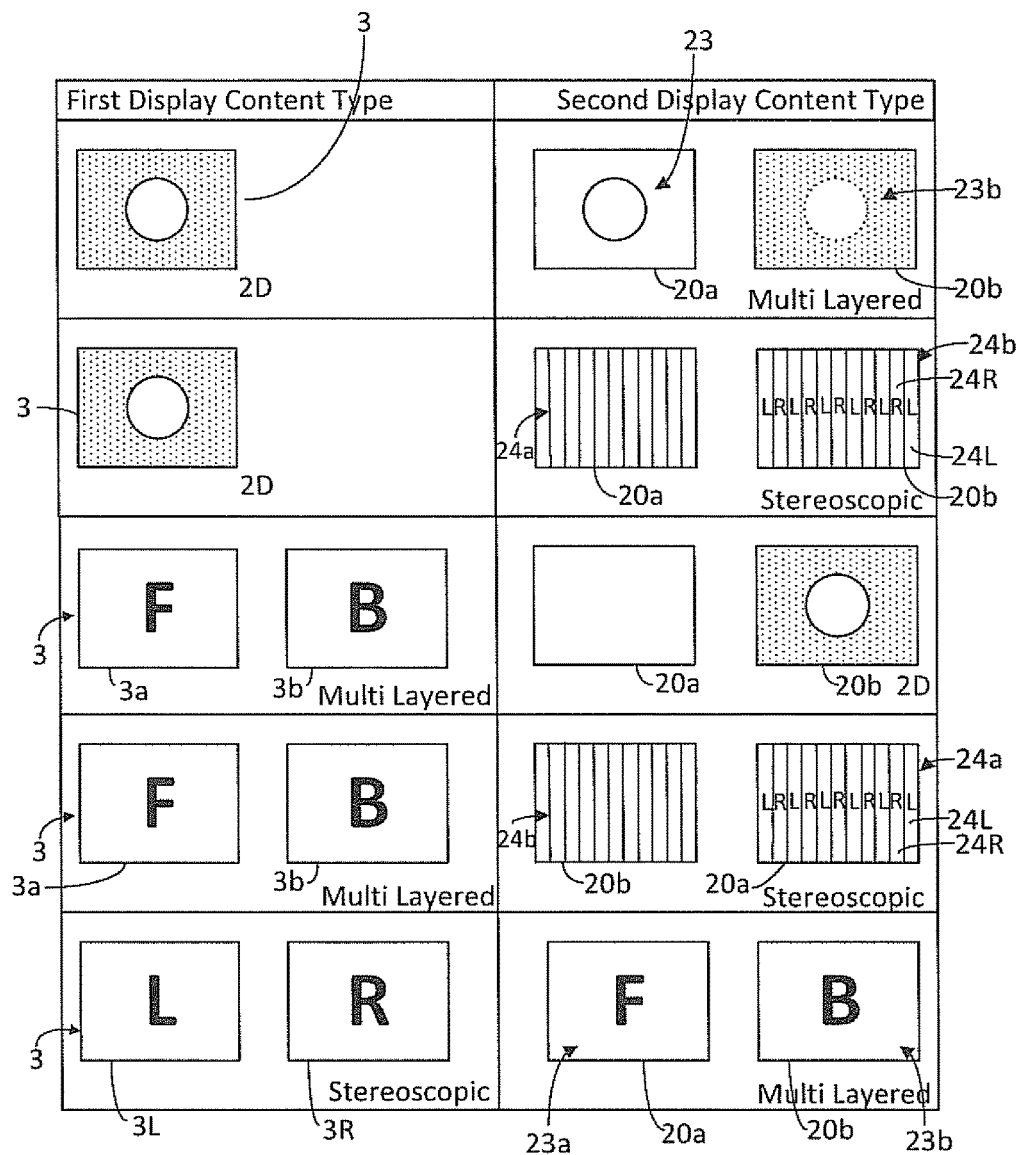
FIG. 6 shows a table of different combinations of input-output images being displayed by the MLD system of FIGS. 5a and 5b.

FIG. 6 shows a table with examples of how an input image (3) of a first display content type (4) can be displayed on an MLD system (7*a*) as a second display content type (6). For example, the first row in FIG. 6 shows a 2D input image (3) specified by the metadata (10) to be displayed as a Multi-Layered image (23) formed from a front image (23*a*) and a rear image (23*b*). In one embodiment, the front image (23*a*) and the rear image (23*b*) may be manipulated so as to provide an Advanced White Silhouetting (AWS) effect.

The second row of FIG. 6 shows a 2D input image (3) that can be specified by the metadata (10) to be displayed as a stereoscopic output image (24). The 2D image (3) can be split into left and right eye components (e.g., a right image (24R) and a left image (24L)) of an interlaced image (24*b*) for display on an MLD system (7*a*). In one embodiment, the stereoscopic effect may be provided by displaying the interlaced image (24*b*) which includes the left and right eye components on the rear display layer (20*b*) and a localized light barrier or parallax barrier (24*a*) displayed or formed on the front display layer (20*a*). The reverse configuration is also possible, e.g., displaying or forming the localized light barrier or parallax barrier (24*a*) on the rear display layer (20*b*) and displaying the interlaced image (24*b*) on the front display layer (20*a*).

The third row of FIG. 6 shows a multi-layered input image (3) including a front input image (3*a*) and rear input image (3*b*) that can be specified by the metadata (10) to be displayed as a 2D output image (21). In one embodiment, the front image (3*a*) and the rear image (3*b*) can be combined and displayed on the rear display layer (20*b*) while the front display layer (20*a*) is made transparent.

The fourth row of FIG. 6 shows a multi-layered input image (3) including a front input image (3*a*) and rear input image (3*b*) that can be specified by the metadata (10) to be displayed as a stereoscopic output image (24). The front input image (3*a*) and the rear input image (3*b*) may be analyzed or processed (e.g., to determine depth information, etc.). A right image (24R) and a left image (24L) may then be generated based on the front input image (3*a*) and the rear input image (3*b*), where the right image (24R) and the left image (24L) may be interlaced to form an interlaced image (24*a*). In one embodiment, the interlaced image (24*a*) may be displayed on the front display layer (20*a*) and a localized light barrier or parallax barrier (24*b*) may be displayed or formed on the rear display layer (20*b*) to produce a stereoscopic image (24) which emulates the layering of the front and rear input images (3*a* and 3*b*) displayed using an MLD system (7*a*). In another embodiment, the interlaced image (24*a*) may be displayed on the rear display layer (20*b*) and a localized light barrier or parallax barrier (24*b*) may be displayed or formed on the front display layer (20*a*) to produce a stereoscopic image (24) which emulates the spacing or layering of the front and rear input images (3*a* and 3*b*) displayed using an MLD system (7*a*).

The fifth row of FIG. 6 shows a stereoscopic input image (3) including a left eye component (e.g., a left image (3L)) and a right eye component (e.g., right image (3R)) that can be specified by the metadata (10) to be displayed as a multi-layered output image (23) including a front image (23a) and rear image (23b). The right image (3R) and the left image (3L) may be analyzed or processed to determine spacing and/or depth information. The spacing and/or depth information may then be used to generate the front image (23a) and the rear image (23b) for display on the MLD system (7a).

The aforementioned method, software and system thus provide means for converting an input image of one display content type into an output image of another display content type by using metadata that specifies the first and/or second display content types and operating a content engine including image data manipulation algorithms which manipulate the data for conversion between the first and second display content types. The second display content type may be a visual effect applied to the input image (then displayed as the output image) to alter the visual appearance for entertainment, quality enhancement, information-conveyance or other purpose. A viewer can thus use the aforementioned method with one type of display system for viewing content designed for another type of display system and vice versa.

Aspects of the present invention have been described by way of example only and it should be appreciated that modifications and additions may be made thereto without departing from the scope thereof.

What is claimed is:

1. A method of manipulating image data in a content engine, said method comprising:
    accessing first image data of a first content type that is configured for display using a first display device;
    accessing first metadata information associated with a manipulation of said first image data, wherein said first metadata information is parameter based;
    generating second image data from said first image data using said first metadata information, wherein said second image data is of a second content type and is configured for display using a second display device, wherein said first and second image data display substantially similar images in different formats, wherein said first metadata information specifies said second content type for said second image data;
    accessing third image data of a third content type that is configured for display;
    accessing second metadata information associated with a manipulation of said third image data;
    generating fourth image data from said third image data using said second metadata information, wherein said fourth image data is of a fourth content type that is configured for display using said second display device, wherein said second metadata information specifies said fourth content type for said fourth image data; and
    simultaneously displaying said second image data and said fourth image data on said second display device, such that each of said second image data and said fourth image data are viewable across contiguous viewing angles, wherein at one or more viewing angles said second image data and said fourth image data are viewable.

2. The method of claim 1, wherein said first content type comprises stereoscopic, said second content type comprises 3D, said third content type comprises stereoscopic, and said fourth content type comprises 2D.

3. The method of claim 1 further comprising:
    automatically detecting a type of said second display device; and
    wherein said generating further comprises generating said second image data responsive to said automatically detecting.

4. The method of claim 1, wherein said first display device is a two-dimensional display, wherein said second display device is a multi-layered display, wherein said generating further comprises separating said first image data into a plurality of portions, and wherein each portion of said plurality of portions is operable for display using a respective display screen of said multilayered display.

5. The method of claim 1, wherein said first display device is a two-dimensional display, wherein said second display device is a multi-layered display, wherein said generating further comprises generating a plurality of images, wherein each image of said plurality of images is operable for display using a respective display screen of said multi-layered display, and wherein said plurality of images are operable to create an effect selected from a group consisting of advanced white silhouetting, enhanced color, enhanced contrast, and depth fusion.

6. The method of claim 1, wherein said first display device is a two-dimensional display, wherein said second display device is a multi-layered display, wherein said generating further comprises generating an interlaced image for display on a first display screen of said multi-layer display, wherein said generating further comprises generating a parallax barrier for display on a second display screen of said multi-layer display, and wherein said interlaced image and said parallax barrier are operable to create a stereoscopic image.

7. The method of claim 1, wherein said first display device is a two-dimensional display, wherein said second display device is a stereoscopic display, wherein said generating said second image data further comprises generating an interlaced image including a first image and a second image, wherein said second image data comprises said first image and said second image, wherein said first image is configured for viewing by a right eye of an observer, and wherein said second image is configured for viewing by a left eye of said observer.

8. The method of claim 7, wherein said second image data comprises at least one depth cue.

9. The method of claim 1, wherein said first display device is a multi-layered display, wherein said second display device is a two-dimensional display, wherein said generating further comprises merging a plurality of images to create said second image data, and wherein said plurality of images are configured for display using a plurality of display screens of said multi-layered display.

10. The method of claim 1, wherein said first display device is a stereoscopic display, wherein said second display device is a multi-layered display, wherein said generating further comprises determining depth information from said first image data, wherein said generating further comprises generating a plurality of images from said first image data based on said depth information, and wherein each image of said plurality of images is configured for display on a respective display screen of said multi-layered display.

11. The method of claim 1, wherein said first display device is a first multi-layer display associated with a first hardware parameter, wherein said second display device is a second multi-layered display associated with a second hardware parameter, and wherein said information is associated with said first and second hardware parameters.

12. The method of claim 11, wherein said first and second hardware parameters are each selected from a group consisting of a spacing between display screens, a level of light diffusion through at least one display screen, a level of polarization through at least one display screen, and a color profile of at least one display screen.

13. The method of claim 11, wherein said first hardware parameter is associated with a relationship of display screens of said first multi-layer display, and wherein said relationship is selected from a group consisting of end-on-end, side-by-side, separate displays, and a combined display.

14. The method of claim 11, wherein said second hardware parameter is associated with a relationship of display screens of said second multi-layer display, and wherein said relationship is selected from a group consisting of end-on-end, side-by-side, separate displays, and a combined display.

15. A non-transitory computer-readable medium having computer-readable program code embodied therein for causing a computer system to perform a method of manipulating image data, said method comprising:
  accessing first image data of a first content type and is configured for display using a first display device;
  accessing first metadata information associated with a manipulation of said first image data, wherein said first metadata information is parameter based;
  generating second image data from said first image data using said first metadata information, wherein said second image data is of a second content type and is configured for display using a second display device, wherein said first and second image data display substantially similar images in different formats, wherein said first metadata information specifies said second content type for said second image data;
  accessing third image data of a third content type that is configured for display;
  accessing second metadata information associated with a manipulation of said third image data;
  generating fourth image data from said third image data using said second metadata information, wherein said fourth image data is of a fourth content type that is configured for display using said second display device, wherein said second metadata information specifies said fourth content type for said fourth image data; and
  simultaneously displaying said second image data and said fourth image data on said second display device, such that each of said second image data and said fourth image data are viewable across contiguous viewing angles, wherein at one or more viewing angles said second image data and said fourth image data are viewable.

16. The computer-readable medium of claim 15, wherein said first content type comprises stereoscopic, said second content type comprises 3D, said third content type comprises stereoscopic, and said fourth content type comprises 2D.

17. The computer-readable medium of claim 15, wherein said method further comprises:
  automatically detecting a type of said second display device; and
  wherein said generating further comprises generating said second image data responsive to said automatically detecting.

18. The computer-readable medium of claim 15, wherein said first display device is a two-dimensional display, wherein said second display device is a multi-layered display, wherein said generating further comprises separating said first image data into a plurality of portions, and wherein each portion of said plurality of portions is operable for display using a respective display screen of said multi-layered display.

19. The computer-readable medium of claim 15, wherein said first display device is a two-dimensional display, wherein said second display device is a multi-layered display, wherein said generating further comprises generating a plurality of images, wherein each image of said plurality of images is operable for display using a respective display screen of said multi-layered display, and wherein said plurality of images are operable to create an effect selected from a group consisting of advanced white silhouetting, enhanced color, enhanced contrast, and depth fusion.

20. The computer-readable medium of claim 15, wherein said first display device is a two-dimensional display, wherein said second display device is a multi-layered display, wherein said generating further comprises generating an interlaced image for display on a first display screen of said multi-layer display, wherein said generating further comprises generating a parallax barrier for display on a second display screen of said multi-layer display, and wherein said interlaced image and said parallax barrier are operable to create a stereoscopic image.

21. The computer-readable medium of claim 15, wherein said first display device is a multi-layered display, wherein said second display device is a two-dimensional display, wherein said generating further comprises merging a plurality of images to create said second image data, and wherein said plurality of images are configured for display using a plurality of display screens of said multi-layered display.

22. The computer-readable medium of claim 21, wherein said second image data comprises at least one depth cue.

23. The computer-readable medium of claim 15, wherein said first display device is a multi-layered display, wherein said second display device is a stereoscopic display, wherein said multi-layered display is operable to display a first image using a first display screen, wherein said multi-layered display is further operable to display a second image using a second display screen, wherein said generating second image data further comprises generating an interlaced image based on said first and second images, wherein said second image data comprises said first image and said second image, wherein said interlaced image includes a first image configured for viewing by a right eye of an observer, and wherein said interlaced image further includes a second image configured for viewing by a left eye of an observer.

24. The computer-readable medium of claim 15, wherein said first display device is a stereoscopic display, wherein said second display device is a multilayered display, wherein said generating further comprises determining depth information from said first image data, wherein said generating further comprises generating a plurality of images from said first image data based on said depth information, and wherein each image of said plurality of images is configured for display on a respective display screen of said multi-layered display.

25. The computer-readable medium of claim 15, wherein said first display device is a first multi-layer display associated with a first hardware parameter, wherein said second display device is a second multi-layered display associated with a second hardware parameter, and wherein said information is associated with said first and second hardware parameters.

26. The computer-readable medium of claim 25, wherein said first and second hardware parameters are each selected from a group consisting of a spacing between display screens, a level of light diffusion through at least one display screen, a level of polarization through at least one display screen, and a color profile of at least one display screen.

27. The computer-readable medium of claim 25, wherein said first hardware parameter is associated with a relationship of display screens of said first multi-layer display, and wherein said relationship is selected from a group consisting of end-on-end, side-by-side, separate displays, and a combined display.

28. The computer-readable medium of claim 25, wherein said second hardware parameter is associated with a relationship of display screens of said second multi-layer display, and wherein said relationship is selected from a group consisting of end-on-end, side-by-side, separate displays, and a combined display.

29. A system comprising a processor and a memory, wherein said memory comprises instructions that when executed by said system implement a method of manipulating image data, said method comprising:
  accessing first image data of a first content type that is configured for display using a first display device;
  accessing first metadata information associated with a manipulation of said first image data, wherein said first metadata information is parameter based;
  generating second image data from said first image data using said first metadata information, wherein said second image data is of a second content type and is configured for display using a second display device, wherein said first and second image data display substantially similar images in different formats, wherein said first metadata information specifies said second content type for said second image data;
  accessing third image data of a third content type that is configured for display;
  accessing second metadata information associated with a manipulation of said third image data;
  generating fourth image data from said third image data using said second metadata information, wherein said fourth image data is of a fourth content type that is configured for display using said second display device, wherein said second metadata information specifies said fourth content type for said fourth image data; and
  simultaneously displaying said second image data and said fourth image data on said second display device, such that each of said second image data and said fourth image data are viewable across contiguous viewing angles, wherein at one or more viewing angles said second image data and said fourth image data are viewable.

30. The system of claim 29, wherein said first content type comprises stereoscopic, said second content type comprises 3D, said third content type comprises stereoscopic, and said fourth content type comprises 2D.

31. The system of claim 29, wherein said method further comprises:
  automatically detecting a type of said second display device; and
  wherein said generating further comprises generating said second image data responsive to said automatically detecting.

32. The system of claim 29, wherein said first display device is a two-dimensional display, wherein said second display device is a multi-layered display, wherein said generating further comprises separating said first image data into a plurality of portions, and wherein each portion of said plurality of portions is operable for display using a respective display screen of said multilayered display.

33. The system of claim 29, wherein said first display device is a two-dimensional display, wherein said second display device is a multi-layered display, wherein said generating further comprises generating a plurality of images, wherein each image of said plurality of images is operable for display using a respective display screen of said multi-layered display, and wherein said plurality of images are operable to create an effect selected from a group consisting of advanced white silhouetting, enhanced color, enhanced contrast, and depth fusion.

34. The system of claim 29, wherein said first display device is a two-dimensional display, wherein said second display device is a multi-layered display, wherein said generating further comprises generating an interlaced image for display on a first display screen of said multi-layer display, wherein said generating further comprises generating a parallax barrier for display on a second display screen of said multi-layer display, and wherein said interlaced image and said parallax barrier are operable to create a stereoscopic image.

35. The system of claim 29, wherein said first display device is a multi-layered display, wherein said second display device is a two-dimensional display, wherein said generating further comprises merging a plurality of images to create said second image data, and wherein said plurality of images are configured for display using a plurality of display screens of said multi-layered display.

36. The system of claim 35, wherein said second image data comprises at least one depth cue.

37. The system of claim 29, wherein said first display device is a multi-layered display, wherein said second display device is a stereoscopic display, wherein said multi-layered display is operable to display a first image using a first display screen, wherein said multi-layered display is further operable to display a second image using a second display screen, wherein said generating second image data further comprises generating an interlaced image based on said first and second images, wherein said second image data comprises said first image and said second image, wherein said interlaced image includes a first image configured for viewing by a right eye of an observer, and wherein said interlaced image further includes a second image configured for viewing by a left eye of an observer.

38. The system of claim 29, wherein said first display device is a stereoscopic display, wherein said second display device is a multi-layered display, wherein said generating further comprises determining depth information from said first image data, wherein said generating further comprises generating a plurality of images from said first image data based on said depth information, and wherein each image of said plurality of images is configured for display on a respective display screen of said multi-layered display.

39. The system of claim 29, wherein said first display device is a first multi-layer display associated with a first hardware parameter, wherein said second display device is a second multi-layered display associated with a second hardware parameter, and wherein said information is associated with said first and second hardware parameters.

40. The system of claim 39, wherein said first and second hardware parameters are each selected from a group consisting of a spacing between display screens, a level of light diffusion through at least one display screen, a level of polarization through at least one display screen, and a color profile of at least one display screen.

41. The system of claim 39, wherein said first hardware parameter is associated with a relationship of display screens of said first multi-layer display, and wherein said relationship is selected from a group consisting of end-on-end, side-by-side, separate displays, and a combined display.

42. The system of claim 39, wherein said second hardware parameter is associated with a relationship of display screens of said second multi-layer display, and wherein said relationship is selected from a group consisting of end-on-end, side-by-side, separate displays, and a combined display.

* * * * *